United States Patent [19]

Mayhak

[11] Patent Number: 4,801,817
[45] Date of Patent: Jan. 31, 1989

[54] APPARATUS AND METHOD FOR STORING VIDEO IMAGES

[76] Inventor: Gary D. Mayhak, 9208 N. 83rd St., Scottsdale, Ariz. 85258

[21] Appl. No.: 904,557

[22] Filed: Sep. 5, 1986

[51] Int. Cl.[4] ............................. H03K 5/04; H03K 5/24
[52] U.S. Cl. .................................... 307/261; 307/265; 307/359; 328/128
[58] Field of Search ............... 307/261, 265, 350, 359; 328/127, 128

[56] References Cited

U.S. PATENT DOCUMENTS 3,504,267 3/1970 James et al. ......................... 328/127
3,835,402 9/1974 Kublick ................................ 328/127

Primary Examiner—John Zazworsky
Attorney, Agent, or Firm—J. Mickevicius

[57] ABSTRACT

An economical method for converting video images into binary form and then storing the binary representations onto disks designed for binary data. A single image will fit onto a single track of the disk. A new method of modulating analog video signals and converting them to binary signals is disclosed. The converted images are then stored in binary form on disks designed for personal computers. A directory of stored images can be maintained on a separate disk under the control of a personal computer. The disk for storing the video images is under the control of a microprocessor.

2 Claims, 3 Drawing Sheets

APPARATUS AND METHOD FOR STORING VIDEO IMAGES

BACKGROUND OF THE INVENTION

Field of the Invention

The present invention relates to storing video images in analog format onto a magnetic media intended primarily for digital data. This is done by using a bit cell modulation technique. This allows economical but very rapid cataloging and retrieval of stored images possible.

SUMMARY OF THE INVENTION

It is an object of this invention to make a video image storage apparatus which is very economical.

It is a further object of this invention to make a video image storage apparatus which utilizes a bit cell modulation technique.

It is a still further object of this invention to make a video storage apparatus which allows easy and rapid retrieval of stored images generated by a bit cell modulation technique.

It is yet another object of this invention to make a video storage apparatus which allows quick and easy storage of video scenes.

The aforementioned and other objects are accomplished, according to the present invention by storing video images in analog fashion onto a disk drive which is intended primarily for digital signal storage. The analog storage is accomplished by varying the delay of a positive transition to reflect the appropriate shade of grey after a synchronizing negative transition for each dot on the picture. Normally, these negative transitions reflect bit synchronization when the disk drive is used for storage of digital information.

The foregoing and other objects, features and advantages of this invention will be apparent from the following, more particular, description of the preferred embodiments of this invention, as illustrated in the accompanying drawings.

Figure 1:
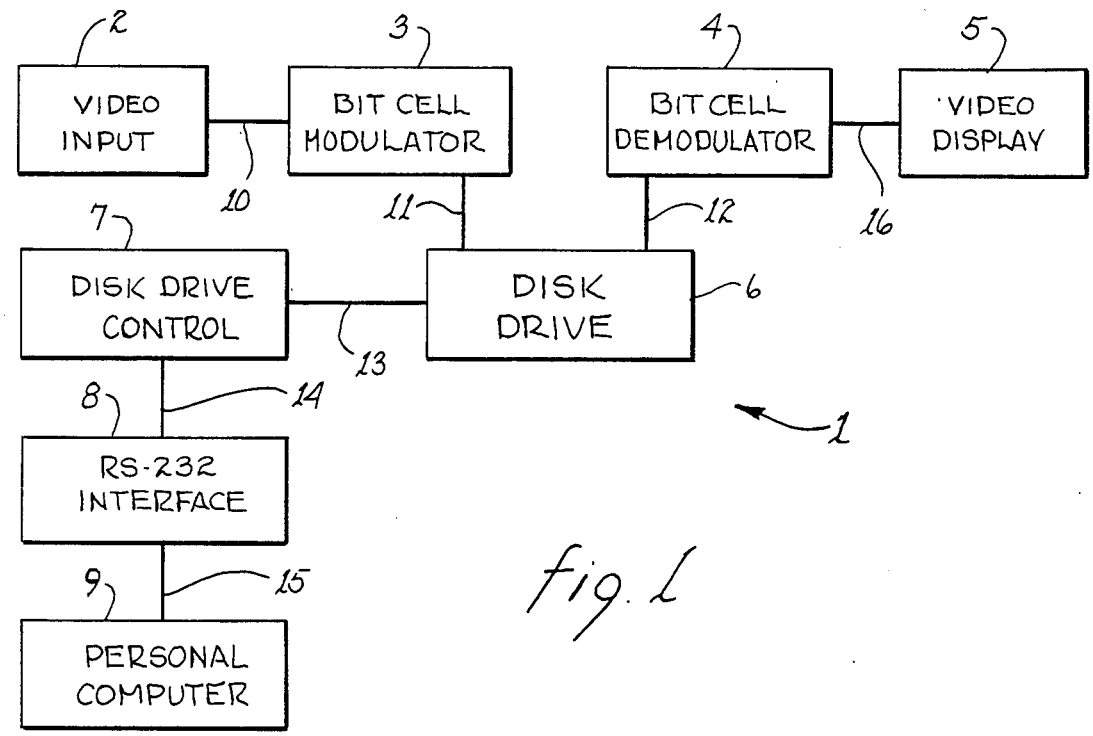
FIG. 1 illustrates an overall block diagram of the inventive system.

A block diagram of the video storage system is presented in FIG. 1. A video camera 2 is connected to bit cell modulator 3. The bit cell modulator 3 is connected to the disk drive 6. The disk drive 6 is connected to disk drive control means 7, bit cell modulator 3 and bit cell demodulator 4. The bit cell demodulator 4 is further connected to a video display unit 5. The disk drive control means 7 is further connected to an interface 8. The interface 8 can be connected to a personal computer 9 or any other type of logic control means.

Figure 2A:
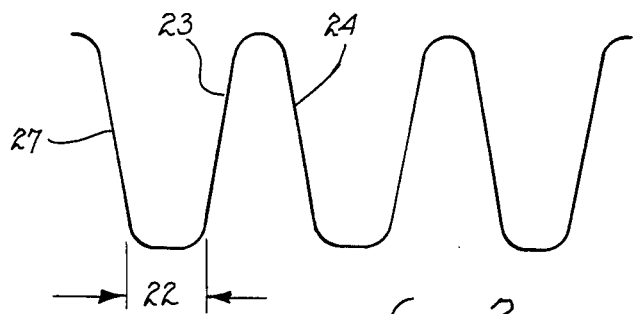
FIGS. 2a and 2b illustrate the storage waveforms used by the inventive system.
Figure 2B:
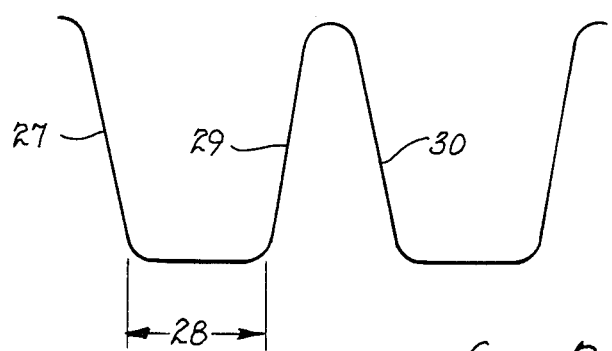

FIGS. 2a and 2b illustrate the recorded waveform using bit cell modulation. In normal digital signal recording, a downward transition indicates the start of a bit position on the media. Normally, each bit takes an even amount of storage on the media. Any variations in the position of the downward transition are normally referred to as bit jitter. In normal pulse width modulation, the time window of a pulse is fixed, but the duty cycle or width of the pulse varies. In the instant invention, the negative transition defines the start of a dot in the video image. The amount of time the pulse is at the low level defines the shade of the color represented. Once a positive transition is detected, signalling the end of the previous dot, a negative transition follows almost immediately. In FIG. 2a, the waveforms which would be recorded to represent a series of white dots are shown. Negative transition 21 represents the start of the pulse. If the pulse is at the negative state for the minimum period of time 22 before the positive transition 23 occurs, one white dot in the video line is represented. As soon as any positive transition, in this example transition 23, is completed, the next negative transition 24 occurs. In FIG. 2b, the waveforms which would be recorded to represent a series of black dots is shown. Again, a negative transition 27 represents the start of the pulse. A pre-defined maximum amount of time exists that the pulse can stay in the low voltage state 28. In order to generate the black dot, the pulse stays in the low voltage state for this pre-defined maximum period of time. At the completion of this pre-defined maximum period of time, positive transition 29 occurs. At the completion of positive transition 29, a negative transition 30 occurs defining the start of the next dot. The amount of time a pulse spends in the low voltage state determines the color of the dot. Note that in this embodiment, the number of dots on a line across a screen is not a constant. If the line is completely black, the number of dots making up the line of the image may be approximately half the number of dots present if the line is completely white. Correspondingly, grey dots would be a length somewhere in between a white dot and a black dot.

Figure 3:
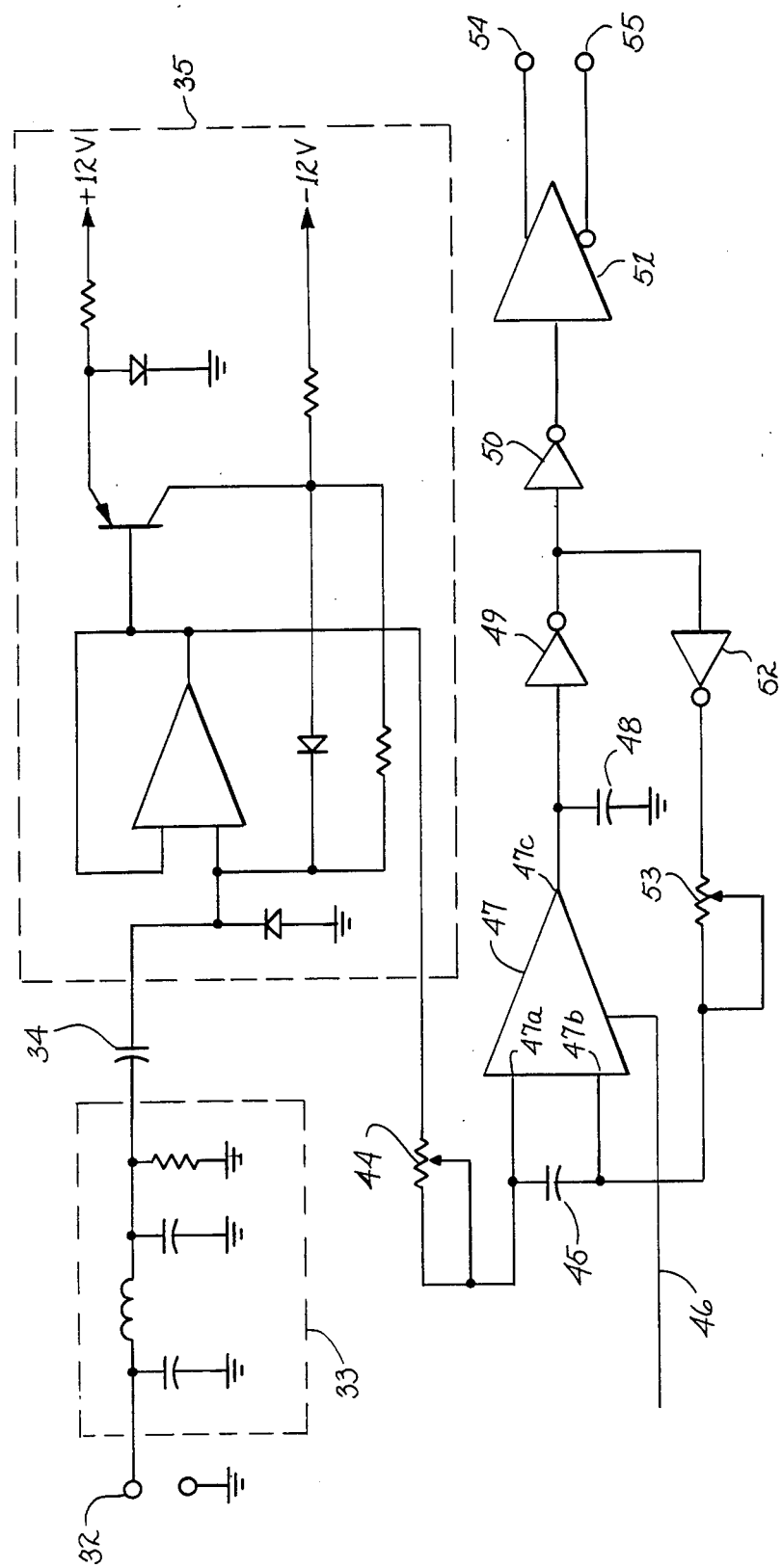
FIG. 3 is a circuit diagram of the bit cell modulator used in the inventive system.

FIG. 3 illustrates the circuit which modulates the incoming video signal utilizing bit cell modulation. The video signal is fed into the bit cell modulator circuit 3 through input port 32. A low pass filter 33 is in series with the input port in order to filter out high frequency noise. The low pass filter 33 in the preferred embodiment would typically pass all frequencies below 3 megahertz. Low pass filter 33 is coupled via capacitor 34 to a dc restorer circuit 35. DC restorer circuits are well known in the video recording art. The output of DC restorer circuit 35 is connected to one terminal of variable resistor 44. A typical value for variable resistor 44 would be 1K ohms. The remaining terminal of variable resistor 44 is connected to input port 47a of comparator 47 and one terminal of capacitor 45. The remaining terminal of capacitor 45 is connected to input port 47b of comparator 47 and one terminal of resistor 53. Output 47c of comparator 47 is connected to one terminal of cap 48 and invertor 49. The output of invertor 49 is connected to input ports of invertors 50 and 52. The output of invertor 50 is connected to the input of driver 51. The output of driver 51 is available at terminals 54 and 55 for recording onto the disk 6.

Figure 4:
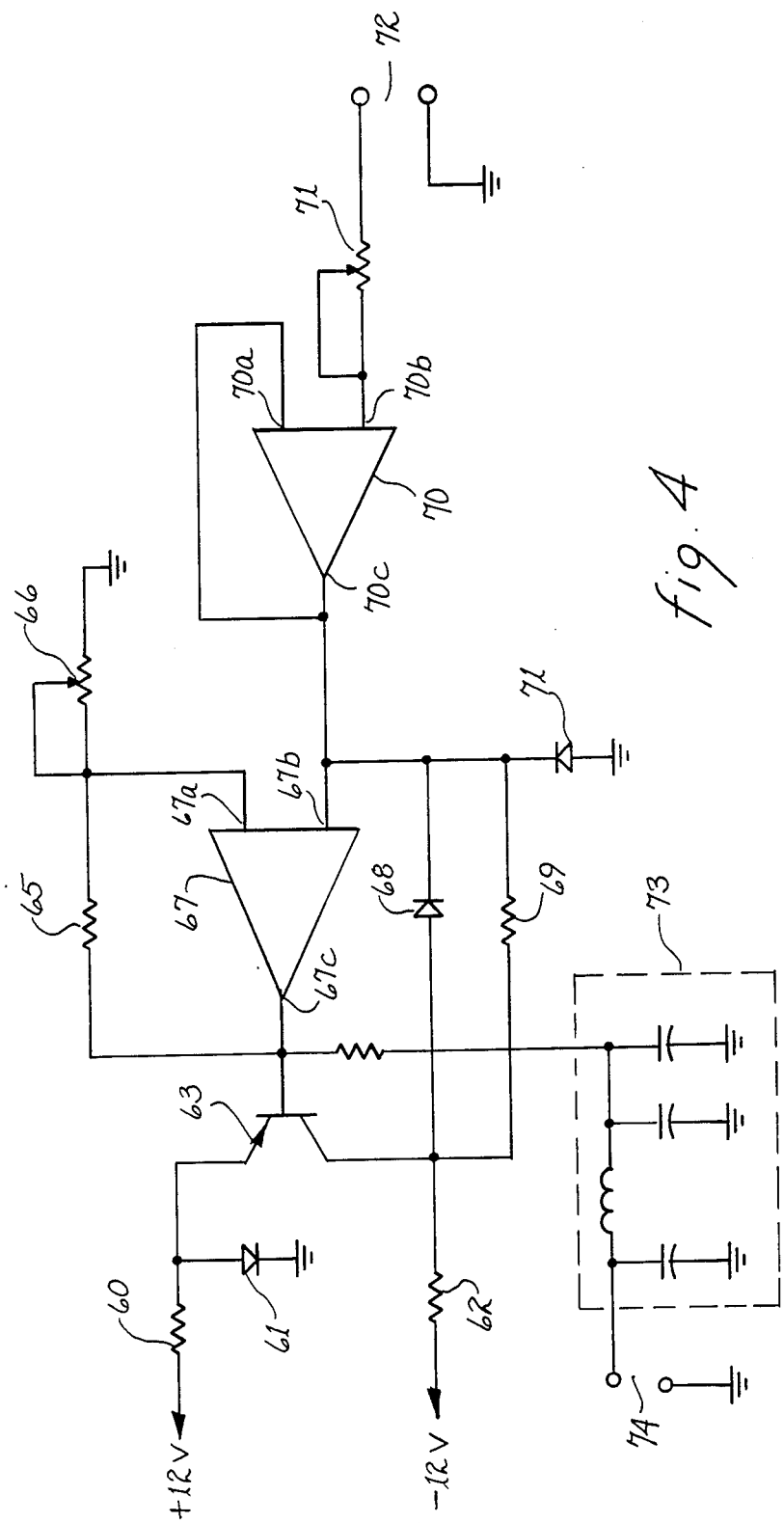
FIG. 4 is a circuit diagram of the bit cell demodulator used in the inventive system.

FIG. 4 is a circuit diagram of the bit cell demodulator circuit for restoring video information from digital data. Input port 72 is connected to one terminal of variable resistor 71. The other terminal of variable resistor 71 is connected to input port 70b of comparator 70. The output port 70c of comparator 70 is connected to the remaining input port 70a of comparator 70, the input port 67b of comparator 67, cathode of diode 68, cathode of diode 71 and one terminal of resistor 69. The anode of diode 71 is connected to ground. The anode of diode 68 is connected to the remaining terminal of resistor 69, the collector of transistor 63 and one terminal of resistor 62. The opposite terminal of resistor 62 is connected to a −12 volt supply. The emitter of transistor 63 is connected to a terminal of resistor 60 and the anode of diode 61. The cathode of diode 61 is connected to ground. The remaining terminal of resistor 60 is connected to a +12 volt supply. The base of transistor 63 is connected to output port 67c of comparator 67, one terminal of resistor 65 and one terminal of resistor 64. The other terminal of resistor 65 is connected to one terminal of resistor 66 and to the input port 67a of comparator 67. The opposite terminal of resistor 64 is connected to a low pass filter 73. Low pass filter 73 will typically pass all signals below a frequency of 2.5 megahertz. The output 74 from low pass filter 73 is available to be hooked up to a video display unit 5.

DESCRIPTION OF THE PREFERRED EMBODIMENT

In the prior art, in order to store a multiplicity of video images, it was necessary to use extremely costly disk media and sophisticated frequency modulation techniques to store images on a video disk. The media itself was very costly because of the large frequency bandwidth that the media was required to be sensitive to. Alternatively, it was more economical to store the images on a tape or to digitize the images and store the digital representations on a disk. The disadvantage of storing the images on a tape is the amount of time it typically takes to retrieve a particular image. As to storing the digitized signals, they typically would take a lot more storage space and computational resources than storing the analog signal. Storage of video images on disk is also known in the art. However, the electronics associated with on disk storage, the media and the recording heads are all relatively expensive because the prior art uses frequency modulation recording. This requires a rather high frequency bandwidth for the recording, typically 12 to 15 megahertz. The present invention combines the rapid access and retrieval benefits of the digital storage system with the simplicity and economy of the analog storage system. One of the novel features of the instant invention is the bit cell modulation technique which allows storage of video images onto media with a considerably lower frequency response bandwidth than that currently known in the art. In the instant invention, the storage media is the type of media used for storing digital data with a personal computer system. The frequency response bandwidth for this type of media is typically much less than 10 megahertz.

Referring now to FIG. 1, the disk drive storage media 6 is controlled by the disk drive control means 7. The disk drive control means 7 in the preferred embodiment is an INTEL 8742 microprocessor. The disk drive 6 in the preferred embodiment is a Model ST225 manufactured by Seagate Technology. Other disk drives which have the proper rotational speed and frequency response characteristics may be used. There are standard interface signals which are available at the output port of disk drive 6. The signals available are control signals for controlling disk drive 6, status signals reporting the status of disk drive 6, and data signals for writing data to or reading data from disk drive 6. The control signals and status signals are connected to disk drive control means 7 from disk drive 6 by means of a control cable. The control signals controlled by disk drive control means 7 are HEAD SELECT, WRITE GATE, STEP, DIRECTION IN and DRIVE SELECT. The status signals reporting the status of disk drive 6 back to disk drive control means 7 are SEEK COMPLETE, TRACK 0, WRITE FAULT, INDEX, and READY.

Data signals to and from disk drive 6 are a differential type signal. Thus, two lines are required for the read function and two lines are required for the write function. The disk drive 6 is connected to bit cell modulator 3 with the write data cable 11. The write data cable 11 contains two conductors, one containing the +WRITE DATA line, the other containing the −WRITE DATA line. Similarly, the disk drive 6 is connected to bit cell demodulator unit 4 with the read data cable 12. The read data cable 12 also contains two conductors, one containing the +READ DATA line, the other containing the −READ DATA line. The bit cell demodulator unit 4 is connected to video display unit 5 through a cable 16. The bit cell demodulator unit 4 obtains the modulated signals from disk drive 6 through read data cable 12, then reconstructs video analog signals and makes the video analog signals available to video display unit 5 through video cable 16.

FIG. 3 is a circuit diagram of the bit cell modulator 3 used in the inventive system. Low pass filter 33, capacitor 34 and DC restorer circuit 35 preprocess the signal. A video signal in the range between 0.2 volts and 1 volt is then applied to the input port 47a of comparator 47. Comparator 47 in the preferred embodiment is a model NE521N manufactured by Signetics. Write enable line 46 into comparator 47 enables operation of comparator 47. The write enable line 46 is typically enabled only when it is desired to either erase or actually write data onto the disk. Inverters 49, 50 and 52 are Schmidt trigger type devices. In the preferred embodiment, these inverters are part of a single package 74LS14 manufactured by Signetics. Driver 51 is a model 26LS31 manufactured by Advanced Micro Devices. Typical values for some of the other components are given below:

Variable Resistor 44: 1K ohm
Capacitor 45: 220 pf
Capacitor 48: 330 pf
Variable Resistor 53: 10K ohm FIG. 4 illustrates the circuit diagram of bit cell demodulator 4. The data is read from disk 6 and is presented at input terminal 72. Input terminal 72 is connected to variable resistor 71. A typical value for variable resistor 71 would be 20K ohms. Operational amplifier 70 in the preferred embodiment is a model CA3140E manufactured by RCA. Comparator 67 is a model LM318N manufactured by National Semiconductor. Typical values for other components are given below:

Resistor 60: 2.2K ohms
Resistor 62: 22K ohms
Resistor 64: 75 ohms
Resistor 65: 1K ohms
Variable Resistor 66: 1K ohms
Resistor 69: 2.2M ohms

SYSTEM OPERATION

The inventive system functions as both a video image storage system and a video image retrieval system. A single image can be stored on each track of disk drive 6. The control and monitoring of space usage of disk drive 6, maintaining a directory of which tracks are in use, which image is located upon which track and which tracks are unused is all done by system control means 9.

System control means 9 would typically be a personal computer system. The system control means 9 is connected to disk control means 7 through some interface means 8. The managing of the allocation and deallocation of space used on disk drive 6 is done by system control means 9 by maintaining a directory of disk drive 6 on a device such as another disk which may be part of system control means 9 or connected thereto. Directory maintenance and disk space control algorithms are old and well known in the computer arts. The fact that in the inventive system that the directory for the disk 6 is maintained not as part of disk 6, but somewhere else, does not affect the programming or table manipulation required. It is only important that the directory actually reflect the true state of space used on disk 6.

When it is desired to store an image on the disk drive 6, an available track is selected upon which the image is to be stored by system control means 9. If a track is available, this is the track used. If no track is available, it would be a matter of programming choice as to whether to require operator intervention or possibly the system can decide to overwrite the oldest image. The manipulations required to do this function are substantially identical to the manipulations required in maintaining a directory on a disk. The only difference is that the directory and the resources managed are on separate physical devices, rather than on the same device, as is the case with a traditional disk. Maintaining directories, managing disk space allocations and notifying an operator of any full conditions are very old programming techniques and are well known in the art.

Once an available track is selected, a control is sent from system control means 9 to disk drive control means 7, directing that the heads be positioned to the appropriate track. Instructions are generated by disk drive control means 7 to disk drive 6 to position the heads of disk drive 6 over the appropriate cylinder. Once the head is in position, the appropriate head which is over the pre-selected track is selected using the HEAD SELECT signals. In recording the video, the first thing that happens is that all the information on the track is erased by elevating the voltage level of the input into bit cell modulator 3 for at least one rotation. This effectively writes a series of white dots onto the track. This step, although not mandatory, is highly desireable to eliminate any residual magnetism which would detract from the clarity of the played back image. After all information on the track is erased, then the video information from video camera 2 is written onto the track. Typically in video recording, a frame of information is stored by recording two fields—one field is interleaved with the other. In the inventive system, no interleaving is done since only one copy of the image is stored onto the track. Since the video camera sends images at a repetition rate of 60 images per second, and the disk drive 6 is rotating at 3600 revolutions per minute or 60 revolutions per second, one image transmitted by the video camera 2 fits perfectly onto the track in one rotation of the track. The sync information to record both vertical sync and horizontal sync is simply embedded in the recorded image.

There are two methods of recording envisioned in the preferred embodiment. In the first embodiment, the recording of the video image can start at any point in the rotation of the disk drive 6. This allows more economical recording technique, since no synchronization circuitry synchronizing disk drive 6 to video camera 2 is required. Upon playback, the horizontal synch and vertical synch information is stored in the recording of the image, along with the rest of the video information. In another, more complex embodiment, it is envisioned that the vertical synchronization of the video image would be synchronized with the INDEX mark on disk drive 6. This would allow image comparison of an image generated by another video camera with the stored image on the disk drive 6. This type of comparison would be useful in computer controlled alignment procedures, for example for a semiconductor chip. By comparing the desired orientation of the image of a chip stored on disk with the image generated by actual orientaiton of the chip in a fixture, it can be determined if the desired and actual orientations coincide. This comparison can be done by inverting one of the video signals, for example the stored desired orientation, and summing with the other video signal, for example the actual orientation of the device. If the sum of the two images, then the actual device can be moved or rotated to minimize the sum. When a zero sum point is found, the two images coincide.

In order to retrieve an image, system control means 9 issues instructions to disk drive control means 7 to retrieve an image from the pre-selected track. The disk drive control means 7 issues instructions to disk drive 6 to position the heads of disk drive 6 over the appropriate cylinder. Once the seek is complete, then the appropriate head is selected and data is then read. The data that is read is transmitted from disk drive 6 through read data cable 12 to bit cell demodulator 4. The bit cell demodulator 4 then sends the image to video monitor means 5. At this point, disk drive 6 is in a constant read and constantly transmitting data to bit cell demodulator 4. There is no storage capability in either bit cell demodulator 4 or video monitor means 5. The data for the picture must be constantly supplied to video monitor means 5 as the lines and dots composing said lines of the particular preselected image are displayed. The rotation speed of disk drive 6 is one of the key features here. Storing a single image on a track and having a disk rotational speed of 3600 RPM allows a refresh rate of the image to be 60 times per second. This yields a sharp and clear picture on video monitor means 5.

One of the inventive features of the video image storage system 1 is the usage of time varying representations of shades of grey. This is accomplished by using a comparator 47 as an active part of an oscillator. The oscillator circuit consists of comparator 47, capacitors 45 and 48, invertors 49 and 52 and variable resistor 53. While the voltage at input port 47a of comparator 47 is less than the voltage at input port 47b, the voltage at the output port 47c of comparator 47 is essentially at ground potential. As soon as the voltage at input port 47b rises to above that of input port 47a, the putput port 47c of comparator 47 will rise to 5 volts. A delay in the rise of the output 47c is forced by the presence of capacitor 48. Further delays are introduced by the response time of the Schmidt trigger inverters 49 and 52. Once the higher voltage is present at the output of inverter 52, then input port 47b will rise as defined by the RC time constant of capacitor 45 and variable resistor 53. Since the voltage level of input port 47a of comparator 47 is essentially the video input signal in the range of 0.2 volts to 1 volt, the amount of time before the voltage level at input port 47b exceeds the voltage at input port 47a, thereby forcing the output level at output port 47c to drop to 0 volts, will not change very much. When the output level at port 47c drops to 0, the voltage level at the output of inverter 52 will also drop a fixed amount of time later. Once the output of inverter 52 drops to 0 volts, the voltage level at input port 47b will also start to drop, again governed by the RC time constant of capacitor 45 and variable resistor 53. However, because the voltage at the output of inverter 52 (0 volts) is close to the voltage at input port 47a (between 0.2 and 1 volt), slight variations in the voltage at input port 47a will affect the amount of time required for the voltage at input port 47b to discharge below the level of input port 47a. This is how the time dependent variations for different shades of grey are achieved.

In order to recover analog video signals from the digital data, the bit cell demodulating circuitry 4 of FIG. 4 is used. A digital signal is read from disk 6 and transmitted via cable 12 to input 72. Operational amplifier 70 is configured as a unity gain operational amplifier by providing a direct connection from output port 70c to input port 70a. The key to demodulating the digital signal received at input 72 is the relatively low frequency response of operational amplifier 70. Because of the rapid changes of state in the incoming digital signal combined with the low frequency response of the operations amplifier 70, operational amplifier 70 essentially acts as a voltage averaging circuit and the signal at output port 70c has essentially the same relative shape as the original analog signal first modulated. Operational amplifier 67 is used to amplify the signal so that it would be within limits for use by video monitor means 5. The output of operational amplifier 67 is then filtered through low pass filter 73 and made available at output port 74.

While the invention has been particularly shown and described in reference to the preferred embodiments thereof, it will be understood by those skilled in the art that changes in form and details may be made without departing from the spirit and scope of the invention.

I claim:

1. A circuit for converting an analog signal to a binary signal comprising:
   comparison means having a first input port, a second input port and an output port, said output port having a first output value if said first input port has a higher voltage level than said second input port and a second output value if said second input port has a higher value than said first input port;
   a first capacitance means between said first input port and said second input port;
   a second capacitance means between said output port of said comparison means and ground potential; and
   connecting means for connecting said output port of said comparison means to said second input port of said comparison means.

2. The circuit for converting an analog signal to a binary signal of claim 1, wherein said connecting means comprises time delay means to delay propogation of changes in voltage value at said output port and resistance means, said resistance means being coupled between said second input port and said time delay means.

* * * * *